United States Patent Office 2,946,720
Patented July 26, 1960

2,946,720

METHOD OF TREATING NEMATODES BY TREATING WITH A HETEROCYCLIC METHYL ISOTHIOCYANATE

Norman J. Lewis, Kirkwood, Mo., assignor to Monsanto Chemical Company, St. Louis, Mo., a corporation of Delaware No Drawing. Filed May 13, 1957, Ser. No. 658,504

13 Claims. (Cl. 167—33)

This invention relates to methods of controlling parasitic worms and minimizing worm populations in agricultural soils. More specifically the invention relates to the destruction of nematodes, trematodes and cestodes in any of the egg, larvae, and adult stages of their life cycles, and particularly the parasitic worms which inhibit the normal development of crop plants.

The problem of controlling nematodes and other objectionable worm life is usually a complex problem, because to be an effective toxicant a compound must be able to penetrate the normally impervious cutex of the worm and the enclosing membranes of the larvae and eggs, and to interfere with a vital function of the organism. The mechanism of destroying the soil worm life is not fully understood, but it is believed that effective toxicants destroy or reduce the effectiveness of vital enzymes. However, a compound which is known to be capable of penetrating the membranes and capable of destroying critical enzymes of the organism may not be a suitable toxicant. The compound must be such that it will remain in the soil in contact with the undesirable worm life for a sufficient period of time to effect the penetration of the worm and destruction or inhibition of the vital enzymes. To achieve this end it will be necessary for the toxicant to resist the destructive activity of soil bacteria, be capable of wetting the organism, to have a substantial water-solubility, to be capable of being readily mixed with the soil, and to have a sufficiently low vapor pressure so that it is not evaporated before the destructive purpose is accomplished. Due to the exacting requirements of a practicable toxicant, it is impossible to predict the effectiveness of a particular chemical.

In accordance with this invention it has been found that the methyl isothiocyanates containing a heterocyclic substituent on the methyl group is an effective class of compositions or compounds useful in the control of parasitic nematodes. The compounds may be represented generically by the following structural formula:

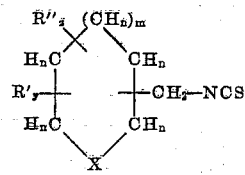

wherein X is a chalkogen having an atomic weight between ten (10) and forty (40), n is an integer from zero (0) to two (2), m is an integer from zero (0) to one (1), y is an integer from zero (0) to three (3), z is a radical from zero (0) to three (3), R' is an alkyl radical having up to three carbon atoms, and R" is a halogen radical.

This class of compounds includes both the α- and β-furfuryl isothiocyanates, α- and β-dihydrofurfurylisothiocyanates, α- and β-tetrafurfuryl isothiocyanates, α- and β-thenylisothiocyanates, α- and β-dihydrothenylisothiocyanates, α- and β-tetrahydrothenylisothiocyanate, the corresponding isothiocyanates having the six member heterocyclic radicals, such as the pyranyl methyl radicals and the above heterocyclic methyl isothiocyanates which have halogen or lower alkyl groups substituted on the hetero ring.

In the use of the toxicants in the destruction of nematodes and other objectionable worm life, the compounds may be applied directly to the soil at rates of 25 to 600 lbs. per acre and may be added in pure state or mixed with suitable liquid or solid diluents. The preferred level of application useful in treating soils of average nematode infestation will be from 50 to 200 lbs. per acre. Obviously heavily infested areas may require the use of higher proportions and lightly infested areas may be treated effectively with smaller proportions.

Further details of the practice of this invention are set forth with respect to the following examples.

Example 1

A 500 ml. reaction flask is charged with 30.3 g. of tetrahydrofurfurylamine and 12 g. of sodium hydroxide dissolved in 75 ml. of water. After cooling the mixture to 15–20° C., 18 ml. of carbon disulfide is added gradually over a 20 minute period, which rate permits the maintenance of the temperature between 15–20° C. through the use of an efficient stirring device and by periodically immersing the reaction flask in an ice bath. When all of the reagents are combined, the stirring should be continued until no further evolution of heat is observed. The flask and its contents are then heated on a steam bath to 80–90° C. and maintained at that temperature for 15 minutes. The solution is then recooled to 15–20° C. and 30.5 ml. of ethyl chlorocarbonate is added gradually during which time the temperature will rise to approximately 35° C. The gradual addition of the ethyl chlorocarbonate will require about 40 minutes. The mixture is then stirred for an additional 45 minutes. The resulting product is then heated on an oil bath at 120–130° C. The reactant is maintained in a vacuum, and gas is evolved as the temperature of the flask contents rises to 90–95° C. which should be maintained for 30 minutes. Upon the vacuum distillation of the product, a substantial quantity of product is obtained at 132° C. and 34 ml. pressure, which product is identifiable as tetrahydrofurfuryl isothiocyanate.

Example 2

The procedure of Example 1 is repeated except that furfurylamine is used in place of the tetrahydrofurfurylamine. The resulting isothiocyanate is found to be a light yellow liquid boiling at 112° C. at 36 ml. pressure. It is identified as furfuryl isothiocyanate.

Example 3

Using thenylamine, the procedure of Example 1 is repeated and a compound recovered which was identifiable as thenyl isothiocyanate.

Example 4

By repeating Example 1, except using pyranylmethylamine, the pyranylmethyl isothiocyanate is obtained.

Example 5

The effectiveness of furfuryl isothiocyanate is measured by preparing a suspension of the nematode *Panagrellus redivivis* in water and observing with a microscope the changes in the motility of the organism as represented by the rate of flexing of the nematode suspended in water. At a concentration of 0.1% the nematodes are completely destroyed in ten minutes, and at a concentration of 0.01% the rate of flexing is reduced to 50% at the end of 24 hours.

Example 6

The use of furfuryl isothiocyanate under soil conditions is determined in a greenhouse using soil infested with the nematode Meloidogyne incognita var. acreta in which tomato seedlings were planted. At a concentration of 0.1% and at a concentration of 0.01% the nematodes are controlled completely, and there is no evidence of phytotoxicity.

Example 7

The procedure of Example 5 is repeated using tetrahydrofurfuryl isothiocyanate. It was found that the motility of the nematode is reduced to zero in 60 minutes at a concentration of 0.1%, and using a concentration of 0.01%, the motility is reduced to zero in 24 hours.

Example 8

The procedure of Example 6 is repeated using tetrahydrofurfuryl isothiocyanate. A good control of the nematode with only slight evidence of phytotoxicity is observed.

Example 9

The procedure of Examples 5 and 7 is repeated using dihydrofurfuryl isothiocyanate as the nematocide.

Example 10

The procedure of Examples 6 and 8 is repeated using dihydrofurfuryl isothiocyanate as the nematocide.

The nematocidal compounds may be added to the soil in solid formulations, frequently referred to as dusts, which may contain in addition to the active ingredient, diluents or extenders to adsorb the readily volatile toxicant and thereby prevent the too rapid dissipation, and dispersing agents to prevent local high concentrations. In addition these components facilitate the distribution of the active ingredient in soil or soil waters.

Suitable solid diluents are those which render the compositions dry and permanently free-flowing. Thus hygroscopic materials should be avoided. Effective solid diluents are the finely divided carriers, including the clays such as the kaolinites, the bentonites and the attapulgites; other minerals in natural state, such as talc, pyrophyllite, quartz, diatomaceous earth, Fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example 50 to 98 percent by weight of the entire formulations. Compositions of this type are useful where there is a tendency for the nematocide to be phytotoxic.

Liquid compositions for nematocidal uses may be solutions or liquid dispersions. The choice of the liquid medium will depend to a great extent upon the physical properties of the active ingredient. If the substituted nitriles are water-soluble, the liquid compositions may be merely an aqueous solution. Where the active component is insoluble in water or soluble only to a limited extent, it is frequently desirable to add a small amount of an organic solvent which can be readily dispersed in the aqueous medium to produce a heterogeneous dispersion of the active ingredient in water.

A valuable class of nematocidal formulations are those wherein there is present a surface active agent, which serves in providing formulations capable of being uniformly distributed in the soil. The surface active agents may be anionic, cationic, or non-ionic and include conventional soaps, such as the water-soluble salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil.

A useful formulation of the nematocidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

Although the heterocyclic methyl isothiocyanates may be used in the pure state, it appears that more effective utilization of the active component is obtained when formulated with the conditioning agents as described.

Although the nematocidal compounds may be used in formulations as described above, it is often more convenient to use the toxicants in their free state. Since many of the compositions are relatively volatile liquids, they may be injected into the soil using regularly spaced injections of such size and distribution so that the entire volume of soil to be treated will contain an effective concentration of the toxicant.

This application is a continuation in part of my co-pending application Ser. No. 498,098, filed Mar. 30, 1955, now abandoned.

What is claimed is:

1. A method of inhibiting the destructive activity of parasitic nematodes in soil which comprises dispersing in the infected soil a toxic amount of a compound having the structure

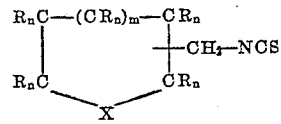

wherein R is a radical selected from the group consisting of hydrogen, alkyl radicals having up to three carbon atoms, and halogen atoms; wherein $n$ is an integer from one (1) to two (2), and $m$ is an integer from zero (0) to one (1) provided that when $m$ is zero (0) the sum of all of integers $n$ is an uneven integer from three (3) to seven (7) and when $m$ is one (1) the sum of all the $n$ integers is an uneven integer from five (5) to nine (9); and wherein X is a chalcogen having an atom weight between ten (10) and forty (40).

2. A method of reducing the parasitic nematode population in soil which comprises dispersing in the infected soil from 25 to 600 pounds per acre of a compound having the structure

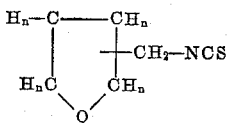

wherein each of $n$ is an integer from one (1) to two (2) and the sum of the $n$ groups is an uneven integer from three (3) to seven (7).

3. A method of reducing the parasitic nematode population in soil which comprises dispersing in the infected soil from 25 to 600 pounds per acre of furfuryl isothiocyanate.

4. A method of reducing the parasitic nematode population in soil which comprises dispersing in the infected soil from 25 to 600 pounds per acre of tetrahydrofurfuryl isothiocyanate.

5. A method of reducing the parasitic nematode population in soil which comprises dispersing in the infected soil from 25 to 600 pounds per acre of dihydrofurfuryl isothiocyanate.

6. A nematocidal composition comprising a water soluble dispersing agent and a compound having the structure

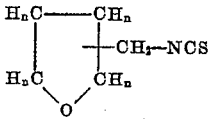

wherein each $n$ is an integer from one (1) to two (2) and the sum of all $n$'s is an uneven integer from three (3) to seven (7).

7. A nematocidal composition comprising a water soluble dispersing agent and furfuryl isothiocyanate.

8. A nematocidal composition comprising a water soluble dispersing agent and tetrahydrofurfuryl isothiocyanate.

9. A nematocidal composition comprising a water soluble dispersing agent and dihydrofurfuryl isothiocyanate.

10. A nematocidal composition comprising an absorption solid carrier and a compound of the structure

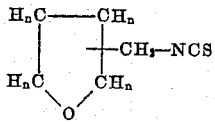

wherein $n$ is an integer between one (1) and two (2) and the sum of the $n$'s is an uneven integer from three (3) to seven (7).

11. A nematocidal composition comprising an absorptive solid carrier and furfuryl isothiocyanate.

12. A nematocidal composition comprising an absorptive solid carrier and tetrahydrofurfuryl isothiocyanate.

13. A nematocidal composition comprising an absorptive solid carrier and dihydrofurfuryl isothiocyanate.

References Cited in the file of this patent

UNITED STATES PATENTS 2,651,579    Plump _____ Sept. 8, 1953

FOREIGN PATENTS 501,642    Great Britain _____ Feb. 28, 1939

OTHER REFERENCES

Braun: Annalen, vol. 445, pp. 201–24, C.A. 20: 390 [7] (1925).

Brown: Can. J. Res., vol. 26 [D], pp. 177–87, C.A., 42: 7912 [a].

Kirner: J.A.C.S., vol. 51, p. 3131 (1920).